United States Patent
Smith et al.

(10) Patent No.: US 7,784,827 B2
(45) Date of Patent: Aug. 31, 2010

(54) VARIABLE OUTPUT USING PIEZO VALVE TECHNOLOGY

(75) Inventors: Bradley W. Smith, Plain City, UT (US); Brent A. Parks, Englewood, CO (US)

(73) Assignee: Autoliv ASP, Inc., Ogden, UT (US)

( * ) Notice: Subject to any disclaimer, the term of this patent is extended or adjusted under 35 U.S.C. 154(b) by 184 days.

(21) Appl. No.: 12/152,179

(22) Filed: May 13, 2008

(65) Prior Publication Data

US 2009/0283995 A1 Nov. 19, 2009

(51) Int. Cl.
*B60R 21/272* (2006.01)
(52) U.S. Cl. .................. 280/737; 280/741; 280/742; 102/530; 137/68.22
(58) Field of Classification Search .......... 280/736, 280/737, 741, 742; 102/530, 531; 137/68.22
See application file for complete search history.

(56) References Cited

U.S. PATENT DOCUMENTS 5,447,051 A 9/1995 Hanks et al.
5,580,086 A * 12/1996 McAlister .................. 280/737
5,947,514 A * 9/1999 Keller et al. ................ 280/742
6,206,420 B1 * 3/2001 Skanborg et al. ............ 280/737
6,412,814 B1 * 7/2002 Huber et al. ................ 280/736
2004/0169359 A1 * 9/2004 Isakov et al. ................ 280/736
2008/0030012 A1 * 2/2008 Mattes et al. ............... 280/736

FOREIGN PATENT DOCUMENTS

DE 19702259 2/1998

* cited by examiner

*Primary Examiner*—Paul N Dickson
*Assistant Examiner*—Keith Frisby
(74) *Attorney, Agent, or Firm*—Sally J Brown; Madson IP, P.C.

(57) ABSTRACT

An airbag inflator that contains a first quantity of inflation gas. This gas may be housed in a chamber. A quantity of liquid fuel may also be added. This fuel may be housed within a liquid fuel chamber. The quantity of inflation gas may operate to pressurize the liquid fuel chamber. A piezo-valve is also added. The piezo-valve seals the liquid fuel chamber. The piezo-valve is capable of variably releasing liquid fuel from the chamber such that when this secondary liquid is ignited, the airbag inflation gas can be augmented as desired.

16 Claims, 2 Drawing Sheets

VARIABLE OUTPUT USING PIEZO VALVE TECHNOLOGY

BACKGROUND OF THE INVENTION

Airbag and airbag technology have been known and used for decades. These airbag systems are designed such that in the event of an accident or crash, the airbag will inflate and become positioned on the interior of the vehicle. Such positioning of the airbag will prevent the vehicle occupant from harmfully impacting the windshield, steering wheel, dashboard, vehicle door, or other portions of the vehicle interior. Airbags have been credited with saving thousands of lives and are now standard on new motor vehicles.

In order to inflate and deploy the airbag during a crash, an inflator is used. The inflator produces and/or channels a large quantity of inflation gas into the airbag, thereby inflating the airbag and causing the airbag to become positioned in the vehicle interior. The quantity of inflation gas that is used to inflate the airbag may either be stored directly in the inflator or may be produced as a result of a pyrotechnic event.

Since the onset of airbags, there has been a desire to provide an airbag inflator that can adapt to the crash conditions of an accident. The reason for this is obvious in that there are an infinite number of crash scenarios that are possible on the road. Accordingly, by allowing the airbag inflator to vary or adapt to these crash conditions, optimized protection for the vehicle occupant could be achieved. In order to achieve this goal, different types of inflators have been designed including inflators that have two separate discharge abilities—i.e., a "high" output and a "low" output. The high output is used in crashes when the airbag needs to be inflated to a higher pressure. The low output is used in crashes when the airbag needs to be inflated to a lower pressure. However, while these inflators do a high and low output, these inflators do not offer a variety of different outputs that may be adapted to differing crash conditions. Such a device is disclosed herein.

BRIEF SUMMARY OF THE INVENTION

An airbag inflator is disclosed. The inflator comprises a first quantity of inflation gas and a quantity of liquid fuel. The quantity of liquid fuel is housed within a liquid fuel chamber. The quantity of inflation gas is capable of pressurizing the liquid fuel chamber. A piezo-valve is also added to the inflator. The piezo-valve seals the liquid fuel chamber. The piezo-valve may operate to variably release liquid fuel from the chamber. The piezo-valve may release an amount of the liquid fuel corresponding to the severity of a crash that is measured by a sensor.

In some embodiments, the airbag inflator further comprises an igniter that combusts the liquid fuel into a second quantity of gas that may mix with the first quantity of gas. In other embodiments, the first quantity of gas is housed within a compressed gas chamber that is sealed by a rupture disk. A frangible support (that is rupturable) may be used to support the rupture disk. The rupture disk will fail when the frangible support fails. An initiator may be used to fail the frangible support. A piston may further be added to the inflator. The piston is positioned in the liquid fuel chamber. The inflator is designed such that when the frangible support fails, the first quantity of gas moves the piston and applies pressure to the liquid fuel.

A method for variably inflating an airbag is also disclosed. The method comprises the step of obtaining an airbag and an inflator, wherein the inflator comprises a first quantity of inflation gas, a quantity of liquid fuel being housed within a liquid fuel chamber, the quantity of inflation gas being capable of pressurizing the liquid fuel chamber, and a piezo-valve that seals the liquid fuel chamber, the piezo-valve capable of variably opening the liquid fuel chamber. The method also includes the step of obtaining a sensor for determining the severity of a crash, wherein the piezo-valve releases liquid fuel corresponding to the severity of the crash. In some embodiments, the first quantity of gas is housed within a compressed gas chamber that is sealed by a rupture disk, the inflator further comprising a frangible support that supports the rupture disk, frangible support being rupturable, wherein the rupture disk fails when the frangible support fails. In other embodiments, a piston may be added to the liquid fuel chamber, wherein when the frangible support fails, the first quantity of gas moves the piston and applies pressure to the liquid fuel.

An airbag system is also disclosed. The airbag system may include a sensor that determines the severity of the crash and an inflator that comprises a quantity of liquid fuel being housed within a liquid fuel chamber and an igniter that combusts the liquid fuel into a quantity of gas. A piezo-valve is also added. The piezo-valve seals the liquid fuel chamber, the piezo-valve for variably releasing liquid fuel from the chamber, wherein the piezo-valve releases an amount of liquid fuel corresponding to the severity of the crash. In some embodiments, the inflator further comprises a first quantity of gas housed within a compressed gas chamber, wherein during deployment, the first quantity of gas mixes with the gas produced by combustion of the liquid fuel. In further embodiments the compressed gas chamber is sealed by a rupture disk, the inflator further comprising a frangible support that supports the rupture disk, frangible support being rupturable, wherein the rupture disk fails when the frangible support fails. In some embodiments, the inflator further comprising a piston in the liquid fuel chamber, wherein when the frangible support fails, the first quantity of gas moves the piston and applies pressure to the liquid fuel. In yet additional embodiments, an initiator operates to fail the frangible support. Further embodiments are designed in which the airbag system additionally comprises an airbag, wherein the airbag may be variably inflated based upon the amount of liquid fuel released by the piezo-valve.

The present embodiments relate to an airbag system that includes an inflator, an airbag, and a sensor that senses the severity of a crash. The airbag inflator includes a chamber that contains a first quantity of gas. This gas may either be stored in the chamber or created by a pyrotechnic event. The chamber is sealed by a burst disk.

It should be noted that the burst disk is supported by a frangible support. In some embodiments, the frangible support contacts the disk and provides support to the disk that prevents the disk from rupturing. In other words, the burst disk will not fail unless and until the frangible support fails. However, if the frangible support fails, the pressure of the first quantity of gas will overcome the structural integrity of the unsupported burst disk and will thus cause the burst disk to fail. An initiator is also added. The initiator is designed such that, when the initiator is fired, the initiator will fail the frangible support.

The inflator also includes a liquid fuel chamber that houses a quantity of liquid fuel. The liquid fuel is a combustible material that will be converted into a quantity of gas if ignited or combusted. A piston is also positioned within the liquid fuel chamber.

The liquid fuel chamber is sealed by a piezo-valve. Piezo-valves are known and have been used in fuel-injection systems for diesel engines. These valves are commercially available, and any type of piezo-valve may be used. The valve may stroke (open) to different lengths depending upon the amount of voltage applied to the valve. Accordingly, the valve will variably open depending upon the amount of voltage applied to the valve. These different stroke lengths will vary the amount of fuel that is dispensed. Depending upon how much of the liquid fuel is needed to fill the airbag, the piezo-valve will selectively open and allow this desired amount of fuel to exit the chamber.

The piezo-valve 1 communicates with the sensor. The amount that the piezo-valve will open (i.e., the amount of the liquid fuel dispensed through the piezo-valve) may be varied. Accordingly, less voltage may be applied to the piezo-valve when the crash is less severe, resulting in a lesser quantity of liquid fuel for gas to fill the airbag. In those situations in which a larger quantity of inflation gas is needed to fill the airbag, a greater voltage will be applied to the piezo-valve and a greater amount of liquid fuel will pass through the valve. Thus, using the piezo-valve, the inflation of the airbag may be tailored as desired, depending upon the severity of the crash detected by the sensor.

When the burst disk is failed, the first quantity of gas escapes the chamber. In turn, this gas moves the piston such that the piston compresses the liquid fuel chamber. The piezo-valve is also opened in accordance with the severity of crash detected by the sensor. The gas and the appropriate amount of liquid fuel then exit the chamber. The liquid fuel is then ignited and converted into another quantity of gas. Thus, this quantity of gas, and the first quantity of gas, mix and are used to inflate the airbag.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the present invention, as represented in the Figures, is not intended to limit the scope of the invention, as claimed, but is merely representative of presently preferred embodiments of the invention.

Figure 1:
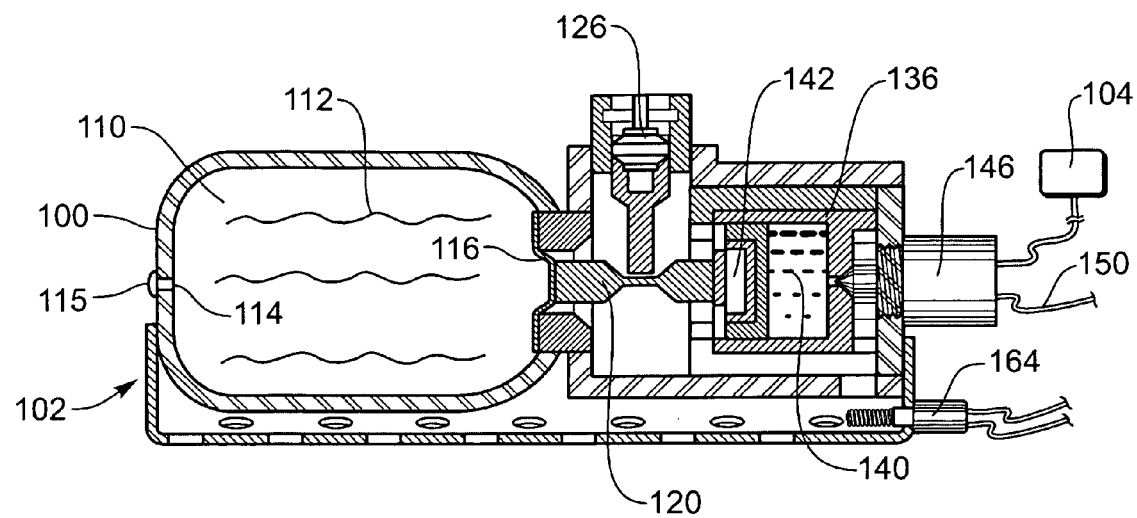
FIG. 1 is a cross-sectional view of an inflator according to the present embodiments, the inflator shown prior to deployment.

FIG. 1 is a cross-sectional view of an airbag inflator 100 according to the present embodiments. The airbag inflator 100 may be part of an airbag system 102. As will be explained herein, the airbag system includes the inflator 100, an airbag 106 (shown in FIG. 3), and a sensor 104. The inflator 100 is designed to inflate the airbag 106 in the event of an accident or crash.

The airbag inflator 100 includes a chamber 110 that contains a first quantity of gas 112. (The first quantity of gas is sometimes referred to as the "first quantity of inflation gas"). The chamber 110 is sealed by a burst disk 116 (which is sometimes called a "rupture disk"). Because the chamber 110 is sealed, the first quantity of gas 112 is housed under pressure. In some embodiments, the gas will be an oxidized compressed gas. Any type of gas known or used in the airbag industry may be used including a noble gas, nitrogen, air, etc., or any mixture of gases. The gas 112 may be added to the chamber 110 via opening 114, which is later sealed by plug 115. In other embodiments, there will be a gas generant in the chamber 110 that will form the gas 112 via a pyrotechnic event. Thus, regardless of whether the gas is formed or is stored in the inflator 100, there will be, at some instant, a quantity of gas 112 that is housed in the chamber 110.

It should be noted that the burst disk 116 is supported by a frangible support 120. (This frangible support may also be referred to as a frangible support pillar). In some embodiments, the frangible support 120 contacts the disk 116 and provides support to the disk 116 that prevents the disk 116 from rupturing. In other words, in the embodiment shown in FIG. 1, the burst disk 116 will not fail unless and until the frangible support 120 fails. However, if the frangible support 120 fails, the pressure of the first quantity of gas 112 will overcome the structural integrity of the unsupported burst disk 116 and will thus cause the burst disk 116 to fail.

It should be noted that other embodiments may be designed in which the disk 116 has sufficient strength and structural integrity to withstand the pressure of the gas 112 without being supported by the frangible support 120. In fact, in these embodiments, the frangible support 120 may be omitted. Rather, the burst disk 116 will prevent the gas from escaping the chamber 110. In fact, in these embodiments a mechanism (such as a projectile, pressure, etc.) must be provided to fail the burst disk 116 to allow the gas 112 to escape from the chamber 110. Of course, the mechanisms that may be used to fail this burst disk 116 are known to those skilled in the art.

As shown in FIG. 1, an initiator 126 is positioned such that it will contact the frangible support 120. The initiator 126 is designed such that, when the initiator 126 is fired, the initiator 126 will fail the frangible support 120 (as described herein).

The inflator 100 also includes a liquid fuel chamber 136 that houses a quantity of liquid fuel 140. The liquid fuel 140 is a combustible material that will be converted into a quantity of gas if ignited or combusted. Those skilled in the art will appreciate a variety of different materials that may be used as the liquid fuel. A piston 142 is also positioned within the liquid fuel chamber 136. The piston 142 is described in greater detail below.

The liquid fuel chamber 136 is sealed by a piezo-valve 146. Piezo-valves are known and have been used in fuel-injection systems for diesel engines. These valves are commercially available, and any type of piezo-valve may be used. A piezo-valve comprises a series of active piezo layers that when stacked, provide adequate force and stroke (i.e., open) to function as a valve in high pressure fuel injection systems. These valves also have the ability to accurately dispense a quantity of liquid fuel into the combustion chamber of the fuel injection system. Those skilled in the art will appreciate that other types of valves may be used.

Accordingly, the present embodiments use this knowledge regarding piezo-valves and incorporate a piezo-valve 146 into the present embodiments. The valve 146 may stroke (open) to different lengths depending upon the amount of voltage applied to the valve. Accordingly, the valve will variably open depending upon the amount of voltage applied to the valve 146. (This voltage may be applied through leads 150). These different stroke lengths will vary the amount of fuel that is dispensed. In other words, depending upon how much of the liquid fuel 140 is needed to fill the airbag 106, the piezo-valve 146 will selectively open and allow this desired amount of fuel 140 to exit the chamber 136.

Those skilled in the art would appreciate that the piezo-valve 146 could then be configured to communicate with the sensor 104. The sensor 104 detects the severity of the crash, and depending upon the severity of the crash, the amount that the piezo-valve will open (i.e., the amount of the liquid fuel 140 dispensed through the piezo-valve 146) may be varied. (Of course, in order to implement this, other electrical components such as wires, etc. may be necessary; however such electronics and wiring are well within the knowledge possessed by skilled artisans). Accordingly, less voltage may be applied to the piezo-valve 146 when the crash is less severe, resulting in a lesser quantity of gas to fill the airbag. In those situations in which a larger quantity of inflation gas is needed to fill the airbag, a greater voltage will be applied to the piezo-valve 146 and a greater amount of liquid fuel 140 will pass through the valve 146. Thus, using the piezo-valve 146, the inflation of the airbag may be tailored as desired, depending upon the severity of the crash detected by the sensor 104.

Figure 2:
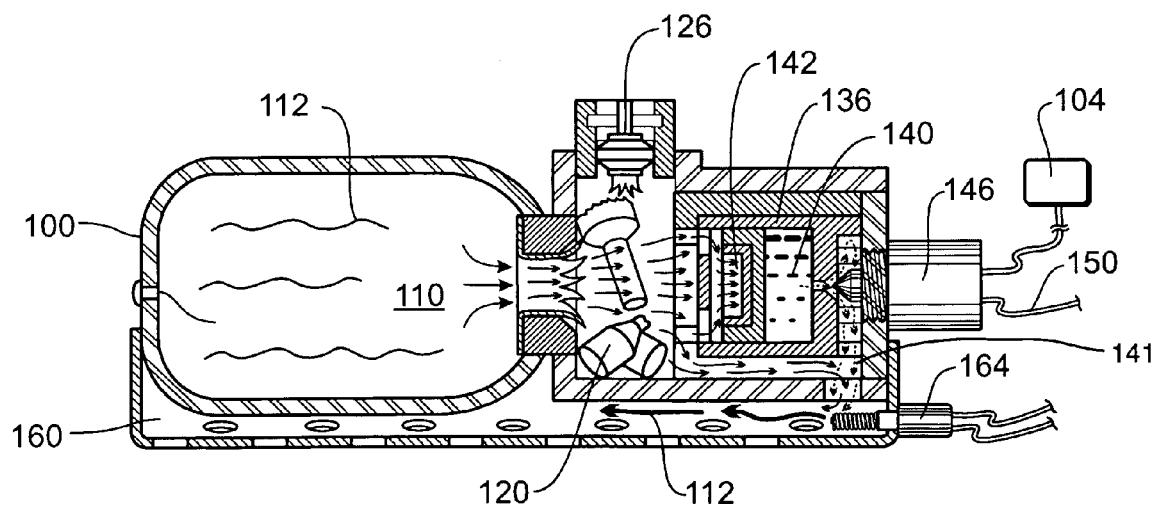
FIG. 2 is a cross-sectional view of the inflator of FIG. 1, the inflator being shown after deployment of the initiator.
Figure 3:
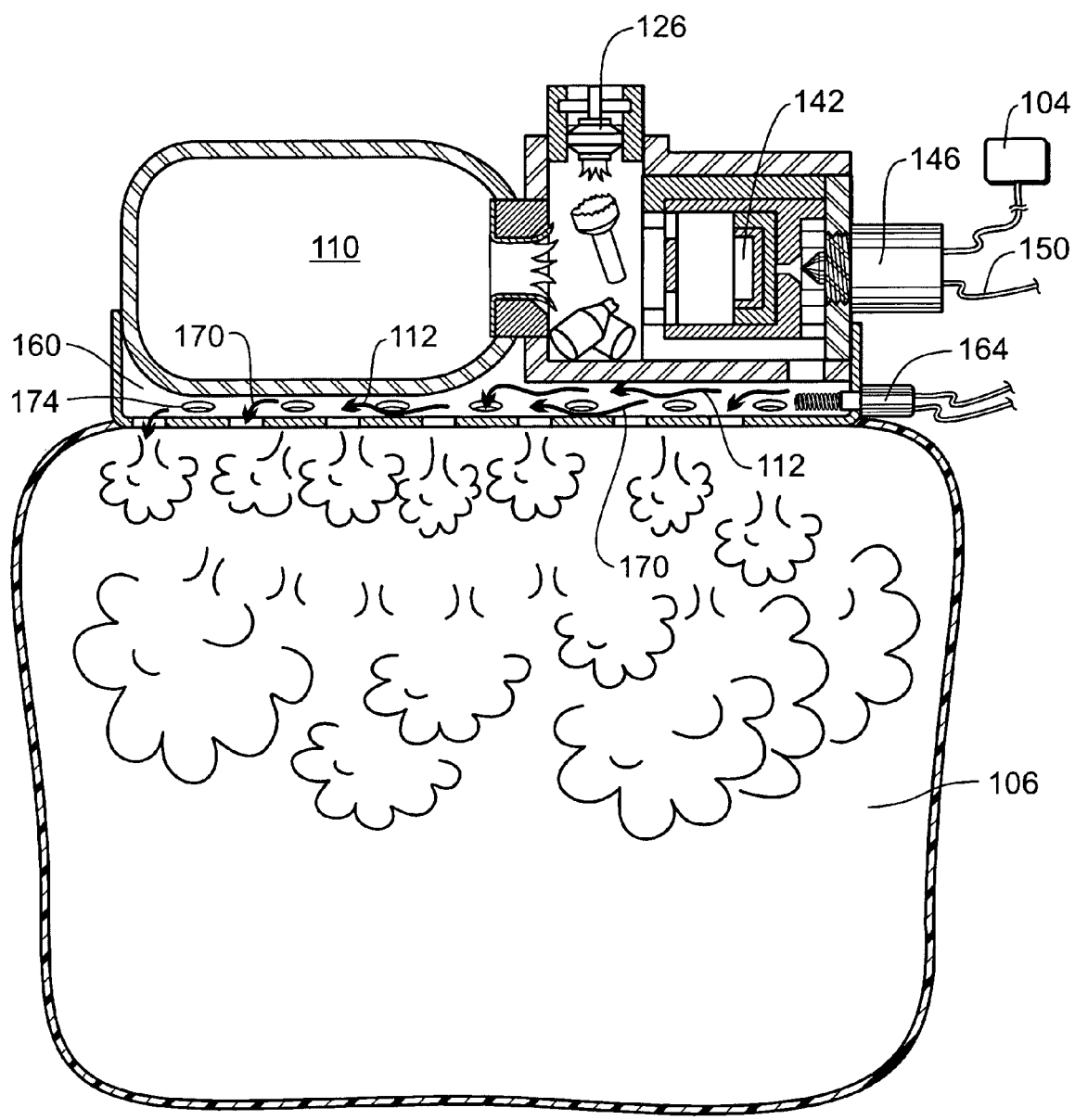
FIG. 3 is a cross-sectional view of the inflator of FIG. 1 after the inflator has been fully deployed.

The concept of using the piezo-valve 146 to tailor the inflation of the airbag will now be discussed in greater detail in conjunction with FIGS. 2 and 3. (FIGS. 2 and 3 illustrate the deployment of the inflator 100). Specifically, FIG. 2 shows the inflator after the initiator 126 has deployed. When this occurs, the initiator 126 will receive a signal indicating crash conditions and will be fired. As noted above, the initiator 126 contacts and/or engages the frangible support 120. Thus, as shown in FIG. 2, the firing of the initiator 126 operates to fail (i.e., break) the frangible support 120.

Once the frangible support 120 has been failed, there is insufficient support being provided to the burst disk 116. Accordingly, the burst disk 116 is unable to withstand the pressures of the chamber 110, and as such, the burst disk 116 fails. Again, as noted above, there are other mechanisms by which the initiator 126 could fail the burst disk 116. All of these other mechanisms are within the scope of the present invention. The use of the frangible support 120 is but one example of the way in which the burst disk 116 may be failed.

When the burst disk 116 is failed, the first quantity of gas 112 escapes the chamber 110. In turn, this gas contacts the piston 142. More specifically, the gas 112 contacts and moves the piston 142. The piston 142 is moved away from the chamber 110. Of course, such movement of piston away from the chamber 110 operates to compress the liquid fuel chamber 136 and compress the liquid fuel 140. Accordingly, the pressure of the chamber 136 that houses the fuel 140 is increased.

At or near the time that the initiator 126 is actuated, the piezo-valve 146 is also actuated. This actuation of the piezo-valve 146 may occur before or after the burst disk 116 is failed. As described above, the piezo-valve 146 may be variably opened depending upon the voltage that is applied to the valve 146. The amount of the applied voltage depends upon the severity of the crash, as measured by the sensor 104. Accordingly, the sensor 104 will determine the severity of the crash and will determine how much inflation gas should be used to inflate the airbag (i.e., how much of the liquid fuel should be released, which fuel is later converted to inflation gas and mixed with the gas 112, so as to inflate the airbag to a pressure that will give optimal impact protection). Based upon this determination, the piezo-valve 146 will be opened to allow the corresponding amount of liquid fuel 140 to exit the chamber 136. Alternatively, the piezo-valve could provide multiple pulses of a set increment of liquid fuel whereby the total fuel released is controlled by the number of pulses.

In the embodiment shown in FIG. 2, the first quantity of gas 112 enters the chamber 136 and contacts (and moves) the piston 142. The first quantity of gas may then be allowed to enter a mixing chamber 141. (This flow of gas is illustrated by the arrows in FIG. 2). The liquid fuel 140 that passes through the open piezo-valve 146 may also enter the mixing chamber 141. (This flow of liquid fuel 140 through the valve 146 into the chamber 141 is illustrated by the arrows in FIG. 2). In this mixing chamber 141, the gas 112 and the liquid fuel 140 mix together. The mixture of gas 112 and liquid fuel 140 may then enter a combustion chamber 160. The mixing chamber 141 may be a separate compartment, or may simply be an area within the inflator (or the gas flow path) which will accommodate mixing.

An igniter 164 is also positioned in the combustion chamber 160. The igniter 164 is a device that is capable of igniting or combusting the liquid fuel 140. (As explained above, this ignition/combustion of the fuel 140 will produce a second quantity of gas). In some embodiments, the igniter 164 may be a glow plug. However, any other device that is capable of igniting/combusting a quantity of liquid fuel may be used such as a device with a wick that is ignited, a spark plug, a heating element, a pyrotechnic, an initiator, etc. Alternatively, residual hot particles from initiator 126 could provide the ignition source.

Referring now to FIG. 3, the inflator 100 is illustrated after the igniter 164 has ignited the liquid fuel 140 (shown in FIG. 2). Again, the ignition/combustion of the fuel converts the fuel into a second quantity of gas 170. (The second quantity of gas is sometimes referred to as the "second quantity of inflation gas"). This second quantity of gas 170 may mix thoroughly and completely with the first quantity of gas 112. Accordingly, in the combustion chamber 160 there will simply be a quantity of gas that has been formed by a mixture of the first and second quantities of gas 112, 170.

As shown in FIG. 3, the combustion chamber 160 includes one or more openings 174. (The openings 174 may be initially sealed by a seal that is removed as part of the actuation process. This type of seal is well known in the industry). The openings 174 allow the gas (which is composed of a mixture of the first quantity of gas 112 and the second quantity of gas 170) to exit the inflator 100 into the airbag 106 to inflate the airbag 106. Again, the amount that the airbag 106 will be inflated depends upon the amount of liquid fuel 140 (shown in FIG. 2) that is released by the piezo-valve 146. This amount of fluid is a function of the crash conditions detected by the sensor 104. If a severe crash is sensed, the airbag 104 may be fully inflated. However, if a "light" crash occurs, the airbag 104 may be less inflated by having only a small amount of the liquid fuel 140 released by the piezo-valve 146. Of course, any amount of inflation of the airbag 106 is possible, depending upon the crash conditions and the amount of liquid released by the piezo-valve 146. Thus, by using the piezo-valve 146, the exact level of inflation of the airbag 106 may be adjusted depending upon crash conditions.

Referring now to all of the Figures collectively, the present embodiments also relate to a method for variably inflating an airbag 106. The method comprises the step of obtaining an airbag 106 and an inflator 100. As noted above, this inflator 100 comprises a first quantity of inflation gas 112, a quantity of liquid fuel 140 being housed within a liquid fuel chamber 136, wherein the first quantity of inflation gas 112 is capable of pressurizing the liquid fuel chamber 136. The inflator 100 also includes a piezo-valve 146 that seals the liquid fuel chamber 136, the piezo-valve 146 capable of variably opening the chamber 136. The method also includes the step of obtaining a sensor 104 for determining the severity of a crash, wherein the piezo-valve 146 releases liquid fuel 140 corresponding to the severity of the crash. The first quantity of gas may be housed within a compressed gas chamber 110 that is sealed by a rupture disk 116, the inflator further comprising a frangible support 120 that supports the rupture disk 116, frangible support being rupturable, wherein the rupture disk 116 fails when the frangible support 120 fails. A piston 142 may also be added to the liquid fuel chamber 136, wherein when the frangible support 120 fails, the first quantity of gas 112 moves the piston 142 and applies pressure to the liquid fuel 140.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. An airbag inflator comprising:
   a first quantity of inflation gas stored under pressure within a compressed gas chamber, the compressed gas chamber being sealed;
   a quantity of liquid fuel being housed within a liquid fuel chamber, the first quantity of inflation gas for pressurizing the liquid fuel chamber;
   a valve that seals the liquid fuel chamber, the valve for variably releasing liquid fuel from the liquid fuel chamber.

2. An inflator as in claim 1 wherein the valve is a piezo-valve.

3. An airbag inflator as in claim 2 further comprising a sensor that determines the severity of the crash, wherein the piezo-valve releases an amount of liquid fuel corresponding to the severity of the crash.

4. An airbag inflator as in claim 1 further comprising an igniter that combusts the liquid fuel into a second quantity of gas that mixes with the first quantity of inflation gas.

5. An airbag inflator as in claim 1 wherein the compressed gas chamber is sealed by a rupture disk.

6. An airbag inflator as in claim 5 further comprising a frangible support that supports the rupture disk, frangible support being rupturable, wherein the rupture disk fails when the frangible support fails.

7. An airbag inflator as in claim 6 further comprising a piston in the liquid fuel chamber, wherein when the frangible support fails, the first quantity of inflation gas moves the piston and applies pressure to the liquid fuel.

8. An airbag inflator as in claim 7 further comprising an initiator that operates to fail the frangible support.

9. A method for variably inflating an airbag comprising:
   obtaining an airbag and an inflator, the inflator comprising:
      a first quantity of gas stored under pressure within a compressed gas chamber;
      a quantity of liquid fuel being housed within a liquid fuel chamber, the first quantity of gas being capable of pressurizing the liquid fuel chamber;
      a piezo-valve that seals the liquid fuel chamber, the piezo-valve capable of variably opening the liquid fuel chamber; and
   obtaining a sensor for determining the severity of a crash and communicating the severity of the crash to the piezo-valve, wherein the piezo-valve releases liquid fuel corresponding to the severity of the crash.

10. A method as in claim 9 wherein the compressed gas chamber is sealed by a rupture disk, the inflator further comprising a frangible support that supports the rupture disk, frangible support being rupturable, wherein the rupture disk fails when the frangible support fails.

11. A method as in claim 10 further comprising a piston in the liquid fuel chamber, wherein when the frangible support fails, the first quantity of gas moves the piston and applies pressure to the liquid fuel.

12. An airbag system comprising:
    a sensor that determines the severity of the crash
    an inflator comprising;
       a first quantity of gas stored under pressure within a compressed gas chamber;
       a quantity of liquid fuel being housed within a liquid fuel chamber; and an igniter that combusts the liquid fuel into a second quantity of gas; and
       a piezo-valve that seals the liquid fuel chamber, the piezo-valve for variably releasing liquid fuel from the chamber, wherein the piezo-valve releases an amount of liquid fuel corresponding to the severity of the crash.

13. An airbag system as in claim 12 wherein the compressed gas chamber is sealed by a rupture disk, the inflator further comprising a frangible support that supports the rupture disk, frangible support being rupturable, wherein the rupture disk fails when the frangible support fails.

14. An airbag system as in claim 13, the inflator further comprising a piston in the liquid fuel chamber, wherein when the frangible support fails, the first quantity of gas moves the piston and applies pressure to the liquid fuel.

15. An airbag system as in claim 14, the inflator further comprising an initiator that operates to fail the frangible support.

16. An airbag system as in claim 12 further comprising an airbag, wherein the airbag may be variably inflated based upon the amount of liquid fuel released by the piezo-valve.

* * * * *